(12) United States Patent
Curtis

(10) Patent No.: X4149
(45) Date of Patent: Jun. 16, 1825

(54) LOOM TEMPLES

(76) Inventor: Philo C. Curtis

Philo C. Curtis
Letters Patent

The Schedule referred to in these Letters Patent and
making part of the same containing a description in the words
of the said Philo C. Curtis himself of his improvement being
machinery for templing cloth. The construction of the above
specified temples is as follows. I form two wheels, one of which
is constructed with moveable arms that can rise and fall as
much as is necessary to allow a spur that is placed on the
underside of the arm near the centre to take hold of the
cloth after the end of the arm has passed over the selvage.
this wheel lies in an inclining position directly over a fixed
arm wheel which lies horizontally under the selvage of the
cloth, and projects enough beyond to receive the end of the move
able arms which are kept from falling into it by the cloth
until they pass over the selvage. after which they are united
and work together, similar to cog wheels. the cloth resting up
on the lower wheel prevents its escaping from the spurs
on the arms of the upper wheel. the periphery of the fixed
arm wheel where the arms is formed into a ratchet wheel
for the purpose of turning the temples as fast as is necessary
without injury to the selvage. the wheels are supported in
their proper position by means of an iron plate about 3 inch
es square, near one edge of which there is a round stud
that supports the lower wheel near the opposite edge there
is a stand that rises over the lower wheel and supports
the upper one. the plate is bolted on to a small bar of
wood or iron that is made fast to the breast beam.
between the breast beam and lathe. which is sufficiently
elastic to allow the temples to move as much as is neces-
sary. to favour the spring of the cloth there is a connection
from the temples to the lathe by means of a strap cord
ro or wire in such a manner that when the lathe is drawn back the temples will always stand the same distance from it; but as it moves forward, the temples are allowed to move with the cloth so that when it is necessary for the temples to turn the cloth will carry them sufficiently back for the hand which is made fast to the breast beam to take a notch in the ratchet wheel; then as the lathe is driven back it carrys the centre of the wheels towards it while the edge is held fast, which causes them to move forward on the selvage without injury to it; the size of the wheels and number of arms may be varied: the size best calculated for common use is about 3 inches in diameter with 20 arms: the body of the top wheel should be about 1 inch and 5 eighths in diameter and three fourths of an inch thick: this wheel has a groove for each arm running towards the centre, and nearly to it on the upper side, and about one fourth of an inch towards it on the under side; the arms are made with a knife on one end; the other end is fitted into the groove of the wheel so as to move easy; these arms have a small hole through the end that goes in the groove through which there is a wire ring passes that is sunk in the upper side of the wheel to keep the arms in their proper places.

In order to set these temples to work, it is necessary to have two sets of wheels, one set for each selvage; they should be placed as near the reed as they can be, without interfering with it. What I claim as my invention or discovery in the above specified temples consists in the construction of a moveable arm wheel with spurs, that are properly adjusted in the selvage by the arms as the wheel turns on its axis; likewise a mate wheel calculated to support the selvage and serve as a ratchet wheel to move them both by the power of the lathe together with the notch

United States Patent

Patent No.: X4149 method for moving solar lamps by means of a ratchet wheel with a pall or hand acting on it, and a connection with the Cathe Witness
John Curtis
William Pratt Jno. C. Curtis Expd.
A.G.C.

DRAFTSMAN'S DIVISION.

*All communications should be addressed to "The Commissioner of Patents, Washington, D. C."*

2—328 *a.*

*DEPARTMENT OF THE INTERIOR,*

United States Patent Office,

*Washington, D. C.,* ..............................., *189*...

*SIR:*

*The printed* copies ............ *of Patent No.* P G Curtis June 16, 1825 are *exhausted.*

*As soon as printed a copy will be mailed you to complete your order.*

*By direction of the Commissioner:*

*Very respectfully,*

*Chief Clerk.*

3143b6-07-3m